United States Patent [19]

Luz

[11] 3,801,857

[45] Apr. 2, 1974

[54] TELEVISION DEFLECTOR CIRCUIT WITH TRANSFORMERLESS COUPLING BETWEEN THE DRIVER AND OUTPUT STAGE

[75] Inventor: David Warren Luz, Indianapolis, Ind.

[73] Assignee: RCA Corporation, New York, N.Y.

[22] Filed: July 27, 1972

[21] Appl. No.: 275,640

[52] U.S. Cl. .......... 315/27 TD
[51] Int. Cl. .......... H01j 29/70
[58] Field of Search .......... 315/27 TD, 27 R, 28, 29

[56] References Cited

UNITED STATES PATENTS

| | | | |
|---|---|---|---|
| 3,501,672 | 3/1970 | Xenakis | 315/27 TD |
| 3,441,673 | 4/1969 | Wheatley, Jr. | 315/27 TD |
| 3,426,244 | 2/1969 | Strachanow | 315/27 TD |

*Primary Examiner*—Maynard R. Wilbur
*Assistant Examiner*—J. M. Potenza
*Attorney, Agent, or Firm*—Eugene M. Whitacre

[57] ABSTRACT

A transformerless coupled driver-to-output stage deflection circuit in which initial driver stage operating current is obtained from a relatively high voltage receiver power supply to initiate operation of the deflection circuit. A relatively low voltage supply is derived from the deflection output stage and coupled to the driver stage such that the greater portion of the driver stage operating current is supplied by the relatively low voltage supply during normal operation.

8 Claims, 1 Drawing Figure

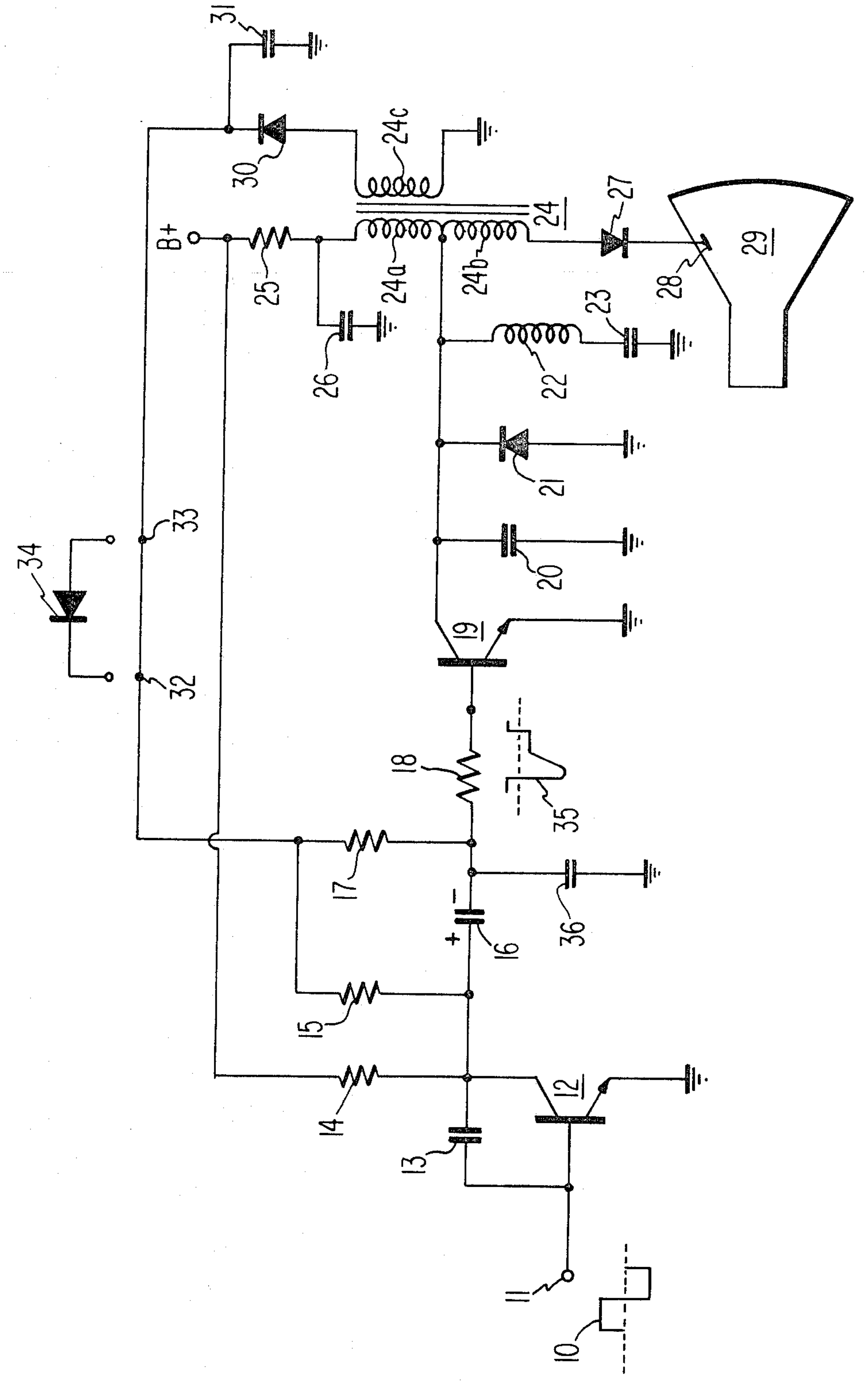
B+
10
11
12
13
14
15
16
17
18
19
20
21
22
23
24
24a
24b
24c
25
26
27
28
29
30
31
32
33
34
35
36

TELEVISION DEFLECTOR CIRCUIT WITH TRANSFORMERLESS COUPLING BETWEEN THE DRIVER AND OUTPUT STAGE

BACKGROUND OF THE INVENTION

This invention relates to electron beam scanning circuits for use in television receivers.

In television receivers it is customary to separate the horizontal and vertical synchronizing signal components from the received composite television signal for use in synchronizing the horizontal and vertical oscillators in the receiver for producing signals which are used to initiate the scanning currents required by the vertical and horizontal deflection windings of the electron beam deflection yoke.

The use of solid state devices, such as transistors, in television receivers enables the use of lower voltage power supplies for the operation of the television receiver stages. It is economical to rectify the power line voltage without the use of a power transformer. The directly rectified line voltage results in a receiver *B*+ supply in the order of 110–140 volts. The horizontal and vertical scanning circuits in the receiver consume a relatively large percentage of the operating current required by the receiver. Suitable transistors are available for use in the horizontal deflection output stage, which transistors can be satisfactorily operated from such a receiver *B*+ supply. The input or drive requirements of the horizontal transistors are such that the driver stage must supply relatively high current at a relatively low voltage compared to the receiver *B*+ voltage. It is common practice to utilize a transformer coupling between the horizontal driver stage and the horizontal output stage to transform the low voltage, high current drive requirements of the output transistor to the high voltage, low current requirements of the driver stage. In this manner the driver stage transistor may be selected to operate directly from the relatively high voltage *B*+ supply.

There can be a further cost reduction in the manufacture of a television receiver if the coupling transformer between the horizontal driver and output transistors could be eliminated. However, without the transformer the driver stage must be operated to supply the low voltage, high current drive directly to the output transistor. This can be accomplished by dropping the receiver *B*+ voltage across a resistor to achieve a suitable operating voltage for the driver stage. However, such an arrangement results in a relatively large amount of power dissipated in the dropping resistor and the high current requirements of the driver transistor present a substantial load to the receiver *B*+ supply.

An object of this invention is to provide an improved electron beam scanning circuit utilizing transformerless coupling between the driver and scanning current output stages.

In accordance with the invention a beam scanning circuit is provided, the circuit including a driver stage transformerless coupled to an output stage. Periodic signals coupled to the driver stage control the operation of the output stage which causes scanning current to flow in a beam deflection winding to define trace and retrace intervals during each scanning interval. A first voltage source coupled to the driver stage supplies operating current thereto and initiates operation of the scanning circuit. The output stage provides voltage vairations corresponding to the trace and retrace scanning intervals. Rectifying means coupled to the output stage rectify these voltage variations and provide a second source of voltage. The second source of voltage is coupled to the driver stage such that, in the presence of the second voltage, the greater portion of the driver stage operating current is drawn from the second voltage source.

A more detailed description of the invention is given in the following specification and single accompanying drawing which is a schematic diagram of a scanning circuit according to the invention.

DESCRIPTION OF THE INVENTION

In the drawing a source of horizontal rate scanning signals providing horizontal deflection rate signals 10, such as supplied by the horizontal oscillator of a television receiver, is coupled to an input terminal 11 of the deflection circuit according to the invention. The driver stage includes a transistor 12 having its base electrode coupled to terminal 11 and its collector electrode coupled through a first load resistor 14 to a source of voltage *B*+. The voltage at the *B*+ terminal may be in the order of +115 volts. The collector electrode of transistor 12 is also coupled through a second load resistor 15 through terminals 32 and 33 to the junction of a rectifying diode 30 and a filter capacitor 31.

A capacitor 13 is connected between the base and collector electrodes of transistor 12 for the purpose of suppressing transients which may be generated by the application of the horizontal drive signal to the transistor 12. The collector electrode of transistor 12 is also coupled through a capacitor 16 in series with a resistor 18 to the base electrode of a horizontal output stage tran-sistor 19. A resistor 17 is coupled from the junction of capacitor 16 and resistor 18 to the junction of resistor 15 and terminal 32. A transient suppressing capacitor 36 is coupled from the junction of capacitor 16 and resistor 18 to ground.

The collector electrode of transistor 19 is commonly coupled to a retrace capacitor 20, a damper diode 21, a horizontal deflection winding 22, and a primary winding 24*a* of a horizontal flyback transformer 24. The other terminals of retrace capacitor 20 and damper diode 21 are connected to ground. The other end of deflection winding 22 is coupled to one terminal of an S-shaping capacitor 23, the other terminal of which is grounded.

Operating potential for the horizontal output stage is supplied by the *B*+ supply coupled through a resistor 25 and transformer primary winding 24*a* to the collector electrode of transistor 19. Resistor 25 and capacitor 26 coupled between the *B*+ supply and winding 24*a* serve to decouple the horizontal output stage from the *B*+ supply. A winding 24*b* of transformer 24 supplies relatively high voltage retrace pulses to a high voltage rectifying unit 27, which, in turn, supplies the high voltage ultor potential to ultor terminal 28 of a television picture tube 29. Another winding 24*c* of flyback transformer 24 supplies voltage variations between the trace and retrace intervals to rectifier 30, which in conjunction with capacitor 31 rectifies the positive trace portions to provide a relatively low DC voltage in the order of 18 volts. This relatively low DC voltage obtained at the cathode of diode 30 is coupled through terminals 33 ad 32 to the junction of resistors 15 and 17.

Operation of the deflection circuit will be described starting from the condition in which the television receiver is first turned on. When the receiver $B+$ supply is energized, current will flow from the $B+$ terminal through resistors 14 and 18 and capacitor 16 to forward bias the base-emitter junction of output transistor 19, causing it to begin conduction. At this time capacitor 16 is being charged with the polarity as indicated. Deflection current will start to flow in the collector circuit of transistor 19 and in deflection winding 22 and transformer 24. When the positive-going portion of the substantially square wave voltage signals 10 coupled to input terminal 11 are applied to the base electrode of transistor 12, transistor 12 will conduct, resistor 14 serving to couple the operating potential from the $B+$ supply to the collector electrode. Conduction of transistor 12 provides a relatively low impedance path for the discharge of capacitor 16. The discharge of capacitor 16 results in the relatively quick cut-off of output stage 19, as the base-emitter junction of transistor 19 becomes reverse biased and excess charge carriers in the transistor are swept away. Resistor 18 serves to limit the discharge current of capacitor 16 in the reverse direction through the base-emitter junction of transistor 19 to somewhat delay the cut-off of transistor 19. The discharge current is illustrated by waveform 35. The relatively quick cut-off of transistor 19 causes its collector voltage to rise sharply, forming the retrace pulse which appears across windings 24*b* and 24*c*. The duration of the retrace pulse interval is controlled by the half cycle of oscillation of reverse current determined primarily by the resonance of winding 22, retrace capacitor 20, and transformer 24. Damper diode 21 performs the conventional function of limiting the oscillation to one-half cycle. The retrace pulses appearing across winding 24*b* are rectified by the rectifying unit 27 for providing the high voltage ultor potential.

The voltage variations appearing across transformer winding 24*c* are rectified and filtered by diode 30 and capacitor 31, providing the relatively low positive DC voltage in the order of 18 volts. This source of voltage is coupled through terminals 33 and 32 to the junction of resistors 15 and 17. Resistor 15 serves as a second collector load resistor for transistor 12 and provides a second path for transistor 12 operating current. Resistor 17 provides a DC forward biasing current for transistor 19 in addition to the forward drive provided by the charging of capacitor 16 to ensure that the average forward drive for transistor 19 is larger than the average reverse drive. This limits the reverse bias across the emitter-base junction of transistor 19 and reduces unnecessary power dissipation.

During the first several cycles of operation after the television receiver is energized, the operating current for transistor 12 is supplied primarily by the $B+$ supply through resistor 14. However, after several cycles of the horizontal deflection circuit operation, the relatively low DC voltage developed by diode 30 and capacitor 31 reaches its steady state value of about 18 volts. With this relatively low voltage present, substantially all of the operating current for transistor 12 is supplied through resistor 15, which is selected to have less resistance than resistor 14. The current through resistor 15 from the +18 volt supply now supplies the main drive current to horizontal output transistor 19. The current through resistor 14 remains at its relatively low value during normal operation of the receiver as well as being the main current supply during warm-up. It has been determined that the ratio of average forward drive current to transistor 19 from the +18 volt supply to drive current supplied by the receiver $B+$ supply is in the order of 8–10 to 1. For the circuit component values listed below, the drive current from the $B+$ supply is about 6 milliamperes and the drive current from the +18 volt supply is about 40 milliamperes.

It should be noted that during the initial turn-on period resistors 15 and 17 are in shunt with resistor 14 and the $B+$ supply and somewhat reduce the forward current drive to transistor 19. To reduce this shunt current during the initial operating period, a diode 34 may be coupled in series between terminals 32 and 33 to effectively disconnect the shunt current path through resistors 15 and 17, as diode 34 will be reverse biased when the relatively low voltage supply is near zero.

The following is a tabulation of circuit element values and types utilized in a successful embodiment of the invention in a television receiver:

R14 — 6.8 KΩ
R15 — 680 Ω
R17 — 1.2 KΩ
R18 — 56 Ω
R25 — 150 Ω
Transistor 12 — 3560
Transistor 19 — 3669
Diode 21 — 6171
Diode 30 — 1872
Diode 34 — 1872
C13 — 220 $\mu\mu f$
C16 — 5.6 $\mu f$
C20 — 840 $\mu\mu f$
C23 — 0.1 $\mu f$
C26 — 0.1 $\mu f$
C31 — 22 $\mu f$
C36 — 0.001 $\mu f$

What is claimed is:

1. An electron beam deflection circuit, comprising:

a deflection winding;

a first source of direct current voltage;

a switching means stage providing an operating current path for said deflection winding coupled to said deflection winding and said first voltage source;

a source of periodic signals;

a driver stage coupled through a first direct current path to said first source of voltage for obtaining operating current therefrom and to said source of periodic signals and to said switching means and responsive to said periodic signals for controlling the operation of said switching means from a first to a second state for causing operating current to flow in said deflection winding and for causing voltage variations to appear in said switching means stage;

voltage rectifying means coupled to said switching means stage for rectifying said voltage variations appearing therein for producing a second direct current voltage which is relatively low compared to said first direct current voltage; and means coupling said rectifying means to said driver stage through a second direct current path whereby operating current for said driver stage is obtained primarily from said rectifying means when said voltage variations appear in said switching means stage.

2. An electron beam deflection circuit, comprising:

a deflection winding;

a transformer;

a first source of direct current voltage;

switching means coupled to said deflection winding, said transformer and said first voltage source;

a source of periodic signals;

a driver stage coupled through a first direct current path to said first source of voltage for obtaining operating current therefrom and to said source of periodic signals and to said switching means and responsive to said periodic signals for controlling the operation of said switching means from a first to a second state for causing operating current to flow in said deflection winding and for causing voltage variations in said transformer;

voltage rectifying means coupled to a winding of said transformer for rectifying said voltage variations appearing across said winding for producing a second direct current voltage which is relatively low compared to said first direct current voltage; and means coupling said rectifying means to said driver stage through a second direct current path whereby operating current for said driver stage is obtained primarily from said rectifying means when said voltage variations appear across said winding.

3. In a television receiver in which a driver stage is transformerless coupled to a horizontal deflection output stage to cause said output stage to periodically conduct to form trace and retrace intervals during each horizontal scanning interval in response to horizontal rate signals coupled to said driver, operating current supply means for said driver stage, comprising:

a first direct current voltage source;

first impedance means coupling said first voltage source to said driver stage for supplying operating current thereto;

a flyback transformer coupled to said output stage for producing voltage variations during said trace and retrace intervals as said first voltage source is supplying current to said driver stage;

a second direct current voltage source including rectifying means coupled to said flyback transformer for transforming said flyback pulses into a second direct current voltage which is relatively low compared to said first direct current voltage; and second impedance means coupling said second source to said driver stage for supplying operating current thereto, said second impedance means having a lower impedance than said first impedance means such that the greater part of said driver stage operating current is supplied by said second voltage source during normal operation of said horizontal output stage.

4. In a television receiver, a horizontal beam deflection circuit comprising:

a first voltage source;

a flyback transformer including first and second windings;

a deflection winding;

a semiconductor output stage having an output electrode coupled to said deflection yoke, said first transformer winding and said first voltage source;

a source of horizontal deflection rate signals;

a semiconductor driver stage having a control electrode coupled to said source of horizontal rate signals and an output electrode coupled through first impedance means to said first voltage source, said output electrode also being coupled to a control electrode of said output stage for supplying drive signals thereto for causing said output stage to conduct current through said deflection winding and said first transformer winding;

rectifying means coupled to said second transformer winding for rectifying voltage variations therein caused by said current in said first transformer winding; and second impedance means coupling said rectifying means to said output electrode of said driver stage for supplying operating current thereto, said second impedance means being selected such that the greater portion of drive current for said semiconductor output stage is conducted from said rectifying means following initial energization of said receiver.

5. In a television receiver, a drive circuit for a horizontal scanning circuit in which a semiconductor driver stage responsive to horizontal rate scanning signals is coupled by a capacitor to a semiconductor horizontal output stage which is energized through an output transformer coupled to a first source of direct current voltage for supplying scanning current to means including a horizontal deflection winding coupled to said output stage, and in which said driver stage controls the conduction of said output stage for forming trace and retrace scanning current intervals in response to said horizontal rate scanning signals, said drive circuit comprising:

first impedance means coupling an output electrode of said driver stage to said first voltage source for supplying operating current thereto and for charging said capacitor for supplying a first portion of driver current to said output stage upon energization of said receiver;

means coupled to said transformer for providing a second source of direct current voltage corresponding to said voltage variations in said transformer, said second voltage source providing a relatively stable voltage after several cycles of operation of said scanning circuit following energization of said receiver; and second impedance means coupling said second voltage source to said output electrode of said driver stage for supplying a second portion of drive current for said output stage following said several cycles of operation.

6. A drive circuit according to claim 5 wherein said first voltage source is of a greater voltage than said second voltage source.

7. A drive circuit according to claim 6 wherein said first and second impedance means are selected such that said drive current supplied by said second voltage source is greater than that supplied by said first voltage source.

8. An electron beam scanning circuit, comprising:

a first switching means;

a source of periodic signals coupled to said first switching means for controlling the operation of said first switching means;

second switching means;

capacitive means coupling said first and second switching means;

deflection current means including a deflection winding coupled to said second switching means;

a first voltage source coupled through a first path to supply a first charging current to said capacitive means for operating said second switch for causing scanning current to flow in said deflection winding;

second voltage source means coupled to said means including said deflection winding for producing a second voltage in response to current variations therein;

means coupling said second voltage source through a second path for supplying a second charging current for said capacitive means, said means being selected such that said second charging current is larger than said first charging current;

said source of periodic signals causing said first switching means to operate for providing a discharge path for said capacitive means, thereby controlling said second switching means for defining trace and retrace intervals during each scanning period.

* * * * *

UNITED STATES PATENT OFFICE

CERTIFICATE OF CORRECTION

Patent No. 3,801,857 Dated April 2, 1974

Inventor(s) David Warren Luz

It is certified that error appears in the above-identified patent and that said Letters Patent are hereby corrected as shown below:

On the title page, in the title, "DEFLECTOR" should read -- DEFLECTION --. Column 2, line 68, "33 ad 32" should read -- 33 and 32 --.

Signed and sealed this 10th day of September 1974.

(SEAL)
Attest:

McCOY M. GIBSON, JR.
Attesting Officer

C. MARSHALL DANN
Commissioner of Patents